United States Patent Office

3,586,660
Patented June 22, 1971

3,586,660
UNITARY LIQUID POLYSULFIDE POLYMER
COMPOSITIONS
Tenji Sakata, Suita-shi, Osamu Nakanishi, Ibaraki-shi, and Ikuo Tanaka, Osaka, Japan, assignors to Sekisui Kagaku Kogyo Kabushiki Kaisha, Osaka, Japan
No Drawing. Filed Sept. 30, 1968, Ser. No. 763,983
Claims priority, application Japan, Oct. 3, 1967,
42/63,923
Int. Cl. C08g 23/00
U.S. Cl. 260—79          6 Claims

ABSTRACT OF THE DISCLOSURE

A stable, curable, substantially anhydrous, unitary liquid polysulfide composition comprising a liquid organic polysulfide polymer having terminal mercapto groups in its molecule, a peroxide curing agent, and an accelerating agent, characterized by said curing agent being selected from zinc peroxide and cadmium peroxide, and said accelerating agent being normally solid and capable of generating a water-soluble acid when reacted with moisture. Preferred accelerating agent is a salt of an aliphatic carboxylic acid having 1 to 5 carbon atoms with an element selected from the group consisting of aluminium, arsenic, copper, chromium, germanium, iodine, lead, manganese, silicon, tin, titanium and zinc.

---

This invention relates to stable, curable, unitary liquid polysulfide polymer compositions for bonding and sealing.

Liquid organic polysulfide polymers having terminal mercapto groups in their molecule were developed by Thiokol Corporation, New Jersey, U.S.A. (see U.S. Patents 2,466,963 and 2,474,859), and have found a wide range of applications as sealants and adhesives under the name "liquid Thiokol." Rubbery substances having excellent resistance to weathering, oil, ozone, or water are obtained by compounding curing agents and fillers at suitable ratios with the liquid polysulfide polymers and thereafter curing them. Peroxides such as lead peroxide are used as the curing agents, and the curing reaction is based on the oxidation of the terminal mercapto groups of the polymers to disulfide groups by the curing agent. In this reaction, water is formed as by-product. J. S. Jorczak and E. M. Fettes of Thiokol Corporation report in I.E.C. 42, 2220 (1950) that the reaction can be retarded with stearic or oleic acid; and in I.E.C. 43, 326 (1951) that alkaline environment accelerates the oxidation and that in some conversion reactions, water has a marked accelerating effect on the rate of conversion during the induction period.

In the earlier stages of the art, cure was normally initiated just prior to use by adding a curing agent to a separately compounded liquid polysulfide polymer, since the pre-mixing of a liquid polymer and a curing agent often resulted in curing of the polymer during storage because either or both of them normally contain moisture. It is disadvantageous to proportion different components accurately and blend them with care.

Irvin P. Seegman et al. overcame this difficulty, and proposed in U.S. Patent 3,225,017 a stable, curable, unitary liquid polysulfide composition. The composition of this patent comprises as the essential ingredients (a) a liquid polyalkylene polysulfide polymer having thoroughly dispersed therein, (b) a dormant curing agent capable of being activated by the presence of moisture, and (c) an alkaline desiccating deliquescent accelerating agent. The alkaline agent maintains the polymer in dry condition and keeps the curing agent dormant during the storage of the composition in a container. But when the composition is disposed in place, the alkaline agent attracts and absorbs moisture from its surroundings and activates the curing agent to cure the polymer.

It has now been found that the curing of the polysulfide polymer by a selected peroxide curing agent is accelerated by acidic environment. Thus, the invention provides a stable, curable, substantially anhydrous, unitary liquid polysulfide composition comprising a liquid organic polysulfide polymer having terminal mercapto groups in its molecule, a peroxide curing agent in an amount sufficient to supply at least a stoichiometric amount of oxygen required to cure said polymer, and an accelerating agent in an amount sufficient to complete said curing within a reasonable period of time upon exposure of said composition to the atmospheric air, characterized by said curing agent being selected from zinc peroxide and cadmium peroxide and said accelerating agent being normally solid and capable of generating a water-soluble acid when reacted with moisture.

The term "stable" used in the specification and appended claims means that the composition according to the invention is stable for a long time when protected from moisture and stored in a container. By the term "curable" is meant that the composition of the invention, when taken out from the container and disposed in place, is capable of being cured by contact of its surface with the atmospheric air.

As the accelerating agent for the composition of the invention, there can be used compounds which generate an inorganic acid on reaction with water, such as stannic chloride, phosphorus pentoxide, phosphorus trichloride and analogous compounds, but the use of compounds which generate an organic water-soluble acid on reaction with water is preferable. Particularly preferable accelerating agents are salts of aliphatic carboxylic acids having 1 to 5 carbon atoms with an element selected from the group consisting of aluminium, arsenic, copper, chromium, germanium, iodine, lead, manganese, silicon, tin, titanium and zinc. Specific examples are aluminium acetate, arsenic acetate, cupric acetate, cupric formate, chromium and chromous acetates and formates, germanium acetate, iodine acetate, lead tetraacetate, manganese and manganic acetates, silicon tetraacetate, stannic acetate, titanium acetate chloride, zinc acetate, and salts analogous to these compounds. Silicon tetraacetate, lead tetraacetate, stannic acetate, cupric acetate and titanium acetate chloride are especially advantageous. Titanium acetate chloride can be easily obtained by reaction of titanium tetrachloride with acetic acid, for example, by adding titanium tetrachloride to glacial acetic acid.

The liquid organic polysulfide polymer may be represented by the general formula

HSRSS—RSS—RSH in which R represents the same or different divalent aliphatic radical substantially free from unsaturation, which radical is principally composed of carbon and hydrogen atoms and may contain oxygen and/or sulfur atoms in the form of etheric oxygen or sulfur, or in the form of hydroxyl or mercapto substituents. These polymers are composed essentially of the unit RSS and the molecular weight will vary depending on the number of these units and also on the specific structure of R. For particular polymers, reference may be had to U.S. Patent Nos. 2,466,963 and 2,474,859. Preferred liquid organic polysulfide polymers have a viscosity of about 1,000 to 200,000 centipoises when measured at 20° C. They may have a molecular weight of about 1,000 to 8,000 and a cross-linking of up to about 20%. Preferred liquid polymers which are commercially available under the tradenames "Thiokol LP-2" and "Thiokol LP-32" have a molecular weight of about 4,000, a cross-linking of about 0.5 to 2%, and a viscosity of about 70,000 to 90,000 centipoises.

As is well known, these liquid organic polysulfide polymers can be cured to solid elastomers by a variety of oxidizing agents, for instance, alkali metal and alkali metal salt peroxides such as sodium peroxide, sodium pyrophosphate peroxide, sodium carbonate peroxide and sodium perborate, alkaline earth metal peroxides such as calcium peroxide and barium peroxide, other metal peroxides such as lead peroxide, zinc peroxide and manganese dioxide, oxidizing agents such as ammonium dichromate, and organic oxidizing agents such as dinitro benzene. In the present invention, zinc peroxide and cadmium peroxide are used selectively from these curing agents. The curing agents not selected here, as far as we know, cannot be activated by the above-mentioned accelerating agents; and even if activated, they have a curing rate as low as impractical, or give compositions having as short a pot life as impractical.

The optimum amount of the curing agent and accelerating agent to be mixed with the polymer may vary from case to case. However, the curing agent should be present in an amount sufficient to supply at least a stoichiometric amount of oxygen required to cure the polymer, and the accelerating agent in an amount sufficient to complete the curing within a reasonable period of time upon exposure of the composition to the atmospheric air. For example, where a liquid organic polysulfide polymer has a molecular weight of about 4,000 and a cross-linking of about 2%, the amount of the curing agent used would be about 4 to 40 parts by weight per 100 parts by weight of the polymer and the amount of the accelerating agent used would be about 2 to 20 parts by weight per 100 parts by weight of the polymer.

A plasticizer such as dibutyl phthalate and chlorinated diphenyl and a pigment and a filler such as calcium carbonate, titanium dioxide, clay and carbon black may optionally be added to the composition of the invention.

The composition of the invention is stable when stored in a sealed container, and does not begin to be cured to a solid elastomer until taken out from the container and left to stand in the atmospheric air. The present invention is not limited by any operational mechanism, but it is presumed that when the composition of the invention is exposed to the atmospheric air, the accelerating agent in the composition reacts with the moisture of the atmospheric air to generate a water-soluble acid, and the action of the acid leads to the activation of the curing agent and the acceleration of the curing reaction. We have already confirmed that a composition consisting of an organic polysulfide and zinc peroxide or cadmium peroxide remains sticky for a long time even when exposed to the atmospheric air, and that addition of a water-soluble acid such as acetic acid to the composition induces curing which is completed within a short period of time. Furthermore, when the composition of the invention is exposed to the atmospheric air in the form of a thick layer, even the deeper portion of the layer is cured within a relatively short time. The reason for this, though not completely made clear yet, is considered to be that since the accelerating agent to be used in the invention generates an acid immediately on reaction with water, water formed as by-product in the curing reaction at the surface portion is not taken up and kept in store in the internal portion, but reacts with unreacted accelerating agent to generate an acid anew, thus serving for the induction of the curing reaction in the deeper portion; in other words, the curing reaction in the deeper portion is induced in the present invention before the moisture diffuses through the already cured surface layer and arrives at the deeper portion.

The following examples are presented to illustrate several embodiments of the invention, and are not intended to be limitative.

EXAMPLE 1

Two hundred grams of "Thiokol LP-2" (trade name, product of Thiokol Corporation), 20 g. of zinc peroxide, 50 g. of "Kanechol #500" (plasticizer; trade name for diphenyl pentachloride of Kanegafuchi Kagaku Kokyo Kabushiki Kaisha), 20 g. of carbon black and 50 g. of titanium dioxide were mixed well by means of two rolls. The mixture was dried well in vacuum, and in a dried condition, mixed with 10 g. of silicon tetracetate. The resulting mixture was loaded into a cartridge for a sealant gun.

In the loaded state, it was left to stand for six months at 20° C., but no change occurred. When it was injected onto a glass plate and left to stand in the atmospheric air, it lost its tackiness in one day, and became a rubber-like substance in one week.

For the sake of comparison, the mixture before addition of silicon tetracetate was put on a glass sheet, and left to stand in the atmospheric air. No change occurred even after the lapse of one month.

EXAMPLE 2

Thirty-five grams of titanium tetrachloride was added to 250 ml. of glacial acetic acid to precipitate titanium chloroacetate. After removal of the supernatant liquid, the precipitate was washed with dried benzene, and dried at 50° C. under reduced pressure. Ten grams of the obtained titanium acetate chloride was used in place of the silicon tetracetate of Example 1. Otherwise, the procedure was the same as that in Example 1, and the resulting mixture was loaded into a cartridge for a sealant gun. No change was observed even when it was left to stand for 6 months at 20° C. On the other hand, when it was injected onto a glass plate and left to stand in the atmospheric air, it became non-tacky in one day, and became a rigid, rubber-like substance in one week.

EXAMPLE 3

Fifteen grams of lead tetracetate, in place of the silicon tetracetate of Example 1, was mixed well in a dry condition with the same mixture as in Example 1 which had been vacuum-dried and completely deprived of water. The resulting mixture was stored in a sealed container for 6 months at room temperature. No change occurred. At the end of the six months' period, a part of the composition in the container was taken out and coated onto a glass plate, thus leaving it to stand in the atmospheric air. It became non-tacky in 4 days, and was completely cured to a rubbery elastomer in 10 days.

EXAMPLE 4

Twenty grams of cupric acetate, in place of the silicon tetracetate of Example 1, was mixed with the same mixture as in Example 1 which had been vacuum-dried and completely deprived of water. A part of the resulting mixture was put on a glass plate, and left to stand in a room. The remainder was loaded into a cartridge for a sealant gun, and stored at room temperature. The sample on the glass plate became non-tacky after the lapse of three days and became a rubbery elastomer in seven days. The mixture loaded into the cartridge was taken out after the lapse of six months, and injected onto a glass plate. In three days, it became non-tacky, forming a film on the surface of the glass plate, and was completely cured to a rubbery elastomer in ten days.

EXAMPLE 5

One hundred grams of "Thiokol LP-32" (trade name of Thiokol Corporation), 30 g. of cadmium peroxide, 60 g. of "Kanechlol percent 500" (plasticizer; trade name for diphenyl pentachloride of Kanegafuchi Kagaku Kogyo Kabushiki Kaisha), 20 g. of carbon black and 50 g. of titanium dioxide were well mixed in a paint mill. The mixture was dried in vacuum, and in a completely anhydrous condition, mixed with 6 g. of silicon tetraacetate. The resulting mixture was stored in a sealed container. It was stable at room temperature for a long time, showing no change even after the lapse of six months. At the end of the six months' period, it was taken out from the container and put on a glass plate. It became non-tacky in 3 days, and was completely cured to a rubbery elastomer in 10 days.

We claim:

1. A stable, curable, substantially anhydrous, unitary liquid polysulfide composition comprising a liquid organic polysulfide polymer having terminal mercapto groups in its molecule and composed essentially of the recurring unit —RSS— in which R represents the same or different divalent aliphatic radical substantially free from unsaturation, which radical is principally composed of carbon and hydrogen atoms, said radical being unsubstituted or substituted with etheric oxygen, etheric sulfur, hydroxyl or mercapto substitutents, a peroxide curing agent in an amount sufficient to supply at least a stoichiometric amount of oxygen required to cure said polymer, and as an accelerating agent a salt of an aliphatic carboxylic acid having 1 to 5 carbon atoms with an element selected from the group consisting of aluminum arsenic, copper, chromium, germanium, iodine, lead, manganese, silicon, tin, titanium and zinc, in an amount sufficient to complete said curing with a reasonable period of time upon exposure of said composition to the atmospheric air, characterized by said curing agent being selected from zinc peroxide and cadmium peroxide, and said accelerating agent being normally solid and capable of generating a water-soluble acid when reacted with moisture.

2. The composition according to claim 1 wherein said accelerating agent is silicon tetraacetate.

3. The composition according to claim 1 wherein said accelerating agent is lead tetraacetate.

4. The composition according to claim 1 wherein said accelerating agent is stannic acetate.

5. The composition according to claim 1 wherein said accelerating agent is cupric acetate.

6. The composition according to claim 1 wherein said accelerating agent is titanium acetate chloride.

References Cited

UNITED STATES PATENTS

| | | | |
|---|---|---|---|
| 2,466,963 | 4/1949 | Patrick et al. | 260—79.1 |
| 3,225,017 | 12/1965 | Seegman et al. | 260—79.1 |
| 3,349,047 | 10/1967 | Sheard | 260—18 |
| 3,402,134 | 9/1968 | Berenbaum et al. | 260—18 |
| 3,402,151 | 9/1968 | Kutch | 260—77.5 |
| 3,402,155 | 9/1968 | Kutch | 260—79 |

DONALD E. CZAJA, Primary Examiner

M. I. MARQUIS, Assistant Examiner

U.S. Cl. X.R.

117—124; 260—18, 31.8, 33.8, 37, 79.1